(12) United States Patent
Yang et al.

(10) Patent No.: US 9,998,999 B2
(45) Date of Patent: *Jun. 12, 2018

(54) TECHNIQUES FOR COORDINATED UPLINK POWER CONTROL

(71) Applicant: Intel Corporation, Santa Clara, CA (US)

(72) Inventors: Rongzhen Yang, Shanghai (CN); Apostolos Papathanassiou, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/083,016

(22) Filed: Mar. 28, 2016

(65) Prior Publication Data

US 2017/0055228 A1 Feb. 23, 2017

Related U.S. Application Data

(63) Continuation of application No. 13/532,841, filed on Jun. 26, 2012, now Pat. No. 9,301,219.

(Continued)

(51) Int. Cl.
| | |
|---|---|
| *H04W 52/24* | (2009.01) |
| *H04W 28/16* | (2009.01) |
| *H04W 36/00* | (2009.01) |
| *H04W 88/10* | (2009.01) |
| *H04B 17/318* | (2015.01) |
| *H04L 5/00* | (2006.01) |
| *H04W 72/08* | (2009.01) |

(Continued)

(52) U.S. Cl.
CPC ........ *H04W 52/241* (2013.01); *H04B 17/318* (2015.01); *H04L 5/0035* (2013.01); *H04L 5/0096* (2013.01); *H04W 28/16* (2013.01); *H04W 36/0061* (2013.01); *H04W 36/0066* (2013.01); *H04W 52/08* (2013.01); *H04W 52/146* (2013.01); *H04W 72/0413* (2013.01); *H04W 72/08* (2013.01); *H04W 88/06* (2013.01); *H04W 88/10* (2013.01); *H04B 17/382* (2015.01); *H04W 48/16* (2013.01)

(58) Field of Classification Search
CPC ............. H04W 36/0066; H04W 88/10; H04W 36/0061; H04W 28/16; H04W 17/0057; H04W 48/16; H04B 17/0077
USPC ......................... 370/328–329, 318, 332, 252
See application file for complete search history.

(56) References Cited

U.S. PATENT DOCUMENTS

| | | | |
|---|---|---|---|
| 7,496,374 B2 * | 2/2009 | Malkamaki | H04L 1/1692 455/442 |
| 8,718,694 B2 * | 5/2014 | Wang | H04W 52/146 370/329 |

(Continued)

*Primary Examiner* — Kwang B Yao
*Assistant Examiner* — Syed M Bokhari

(57) ABSTRACT

Examples are disclosed for determining, at a base station, a target received power parameter for a wireless device in communication with the base station. In some examples, the target received power parameter may be determined based on one or more uplink status signals received from the wireless device at the base station and/or one or more other base stations. For these examples, the wireless device may adjust one or more transmit power levels responsive to receiving the target received power parameter from the base station. Other examples are described and claimed.

28 Claims, 10 Drawing Sheets

Related U.S. Application Data

(60) Provisional application No. 61/589,774, filed on Jan. 23, 2012.

(51) Int. Cl.
| | | |
|---|---|---|
| *H04W 88/06* | (2009.01) |
| *H04W 52/08* | (2009.01) |
| *H04W 52/14* | (2009.01) |
| *H04W 72/04* | (2009.01) |
| *H04W 48/16* | (2009.01) |
| *H04B 17/382* | (2015.01) |

(56) References Cited

U.S. PATENT DOCUMENTS

| | | | |
|---|---|---|---|
| 2003/0156556 A1* | 8/2003 | Puig-Oses | H04W 72/0413 370/328 |
| 2010/0238895 A1* | 9/2010 | Nakatsugawa | H04W 16/14 370/329 |
| 2011/0064041 A1* | 3/2011 | Hooli | H04L 5/0007 370/329 |
| 2011/0199919 A1* | 8/2011 | Lin | H04B 7/155 370/252 |
| 2013/0121186 A1* | 5/2013 | Vajapeyam | H04W 72/085 370/252 |

* cited by examiner

Storage Medium 700

*Computer Executable Instructions for 500*

*Computer Executable Instructions for 600*

*FIG. 7*

TECHNIQUES FOR COORDINATED UPLINK POWER CONTROL

RELATED CASE

This application is a continuation of, claims the benefit of and priority to, previously filed U.S. patent application Ser. No. 13/532,841, filed Jun. 26, 2012, which claims priority to U.S. Provisional Patent Application No. 61/589,774, filed on Jan. 23, 2012, both of which are hereby incorporated by reference in their entirety.

BACKGROUND

User equipment or wireless devices coupled to a wireless network may couple to the wireless networks via downlink transmission points (TPs) that may be different than uplink reception points (RPs). For example, a wireless device may receive strong downlink transmission signals from a base station but one or more other base stations may have weaker downlink transmission signals, yet stronger uplink signals may be received at these other base stations from the wireless device. This situation is typically encountered in deployments where the different base stations have different maximum transmission powers, e.g., when a number of pico base stations are installed within the coverage of a macro base station. As a result, it may be desirable for the wireless device to use the first base station as a downlink TP and to use one of the other base stations as an uplink RP.

BRIEF DESCRIPTION OF THE DRAWINGS

FIG. 7 illustrates an example of a storage medium.

DETAILED DESCRIPTION

Figure 1A:
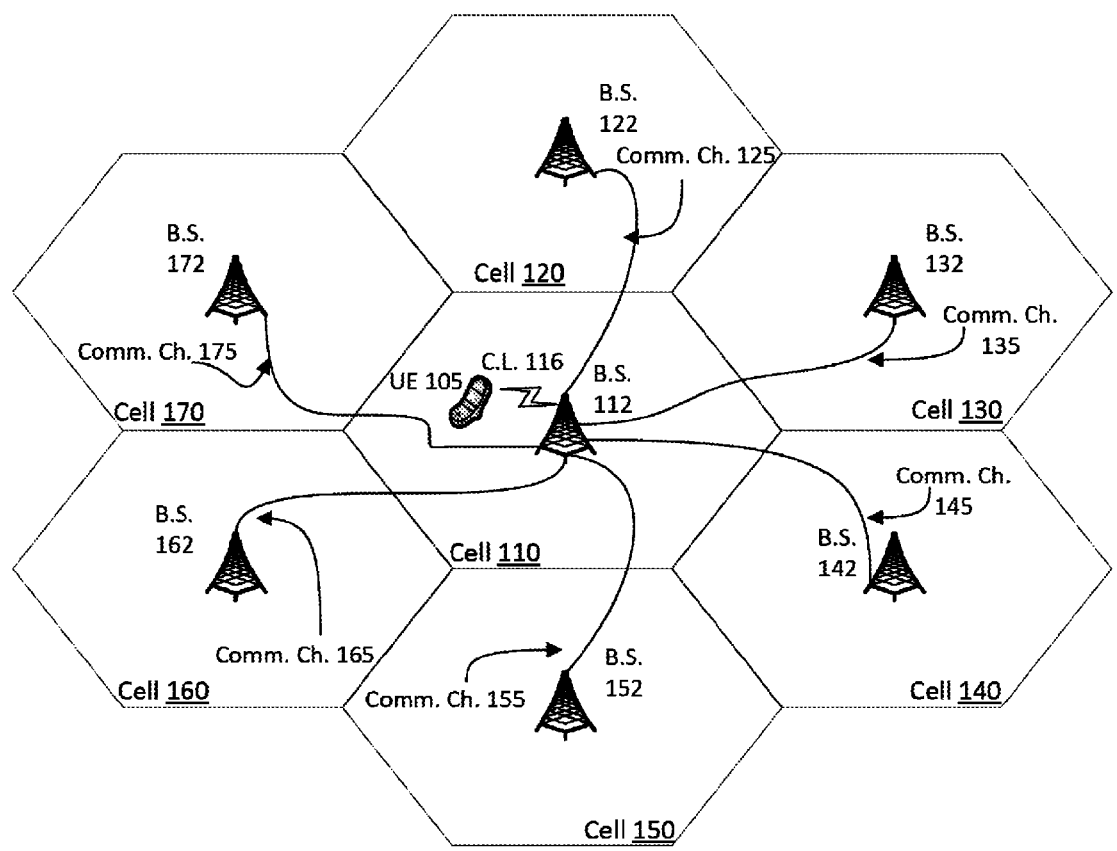
FIGS. 1A-B illustrate examples of a system.

Examples are generally directed to improvements for wireless mobile broadband technologies. Wireless mobile broadband technologies may include any wireless technologies suitable for use with wireless devices or user equipment (UE), such as one or more third generation (3G) or fourth generation (4G) wireless standards, revisions, progeny and variants. Examples of wireless mobile broadband technologies may include without limitation any of the Institute of Electrical and Electronics Engineers (IEEE) 802.16m and 802.16p standards, 3rd Generation Partnership Project (3GPP) Long Term Evolution (LTE) and LTE-Advanced (LTE-ADV) standards, and International Mobile Telecommunications Advanced (IMT-ADV) standards, including their revisions, progeny and variants. Other suitable examples may include without limitation Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

By way of example and not limitation, various examples may be described with specific reference to various 3GPP LTE and LTE-ADV standards, such as the 3GPP LTE Evolved UMTS Terrestrial Radio Access Network (E-UTRAN), Universal Terrestrial Radio Access (E-UTRA) and LTE-ADV Radio Technology 36 Series of Technical Specifications (collectively "3GPP LTE specifications"), and IEEE 802.16 standards, such as the IEEE 802.16-2009 standard and current third revision to IEEE 802.16 referred to as "802.16Rev3" consolidating standards 802.16-2009, 802.16h-2010 and 802.16m-2011, and the IEEE 802.16p draft standards including IEEE P802.16.1b/D2 Jan. 2012 titled "Draft Amendment to IEEE Standard for Wireless-MAN-Advanced Air Interface for Broadband Wireless Access Systems, Enhancements to Support Machine-to-Machine Applications" (collectively "IEEE 802.16 standards"), and any drafts, revisions or variants of the 3GPP LTE specifications and the IEEE 802.16 standards. Although some embodiments may be described as a 3GPP LTE specifications or IEEE 802.16 standards system by way of example and not limitation, it may be appreciated that other types of communications system may be implemented as various other types of mobile broadband communications systems and standards. The examples are not limited in this context.

As contemplated in the present disclosure, a wireless device may use a base station of a wireless network as a downlink TP yet use another base station from among one or more other base stations of the wireless network as an uplink RP. Some industry standards such as those associated with 3GPP LTE-ADV utilize one or more transmit power control algorithms that may be implemented at the wireless device to adjust the transmission power level of the wireless device. These transmit power control algorithms may depend on information received from the base station serving as the downlink TP for the wireless device. The information may include a target received power parameter or $P_O$.

In uplink power control according to some 3 GPP LTE-ADV standards, a target received power parameter or $P_O$ used in the transmit power control algorithms may reflect cell specific characteristics, wireless device specific characteristics as well as a distinction between physical uplink shared channel (PUSCH) and physical uplink control channel (PUCCH) in each carrier component (CC). However, the cell specific characteristics may only reflect characteristics (e.g., uplink signal strengths) at the downlink TP. This may be problematic when a wireless device has a base station for a downlink TP and a different base station for an uplink RP. As a result, the wireless device may receive a $P_O$ that does not reflect characteristics at the uplink TP. The wireless device may then adjust its uplink transmission power in a way that may use more power than is needed and/or cause unnecessary interference with other wireless devices in the wireless network.

In some examples, techniques are implemented for determining, at a base station of a wireless network, a target received power parameter or $P_O$. For these examples, an uplink status signal may be received at the base station from a wireless device. One or more other uplink status signals received at one or more other base stations from the wireless device may be monitored, e.g., via a communication channel interconnecting the base station to the one or more other base stations. A first target received power parameter for the wireless device may be determined based, at least in part, on the received uplink status signal and on the one or more other uplink status signals received at the one or more other base stations. The first target received power parameter may then be transmitted to the wireless device.

Figure 1B:
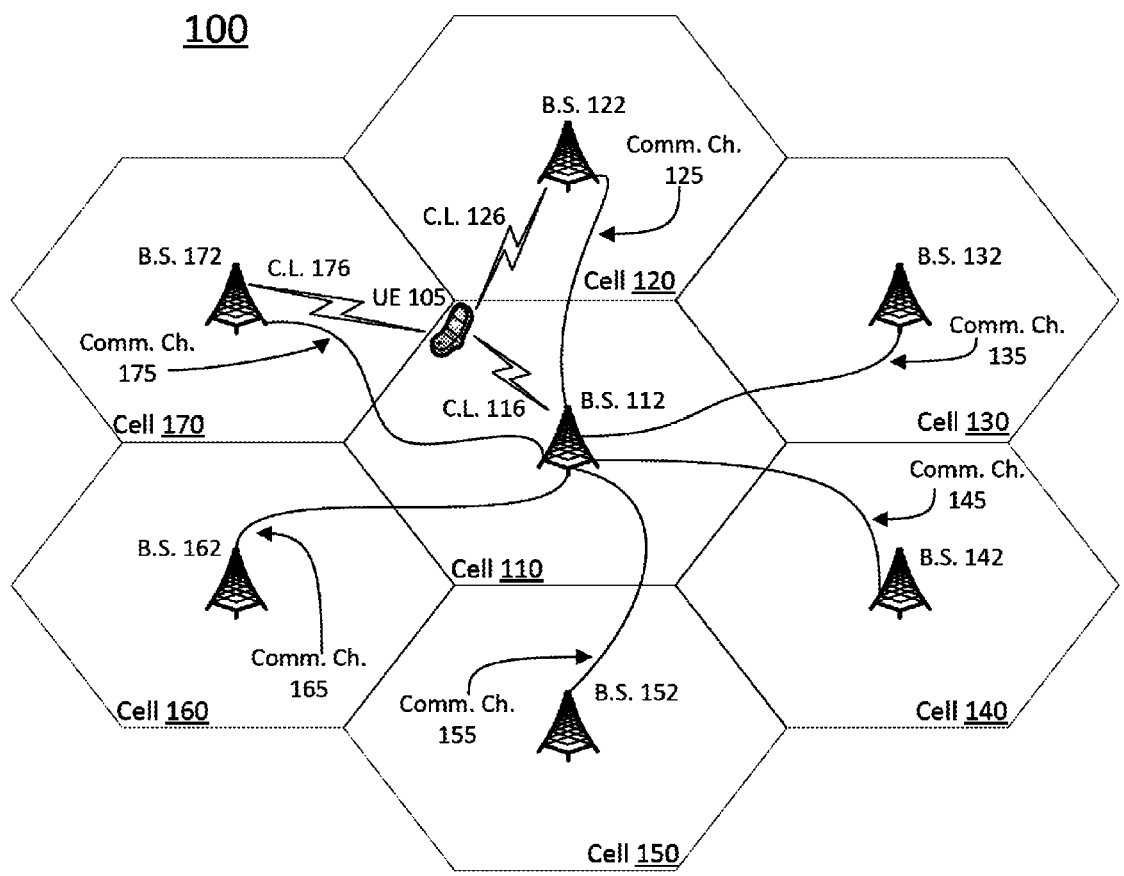

FIGS. 1A-B illustrate examples of a wireless network 100. In some examples, as shown in FIGS. 1A and 1B, wireless network 100 includes cells 110 to 170. In some examples, system 100 may be a wireless network and cells 110, 120, 130, 140, 150, 160 and 170 may separately include base stations (B.S.) 112, 122, 132, 142, 152, 162 and 172, respectively. For these examples, user equipment (UE) 105 may be arranged to communicatively couple to at least some of these base stations. As shown in FIG. 1A, UE 105 may communicatively couple to B.S. 112 via communication link (C.L.) 116. Also, as shown in FIGS. 1A-B, B.S. 112 may be coupled to B.S. 122, 132, 142, 152, 162 and 172 via communication channels (Comm. Ch.) 125, 135, 145, 155, 165 and 175, respectively.

According to some examples, UE 105 may receive communication signals from base station 112 via C.L. 116. As shown in FIG. 1A, UE 105 may be located within an area serviced by B.S. 112 for cell 110. For these examples, UE 105 may be located relatively close to B.S. 112. Due to UE 105's close proximity to B.S. 112, UE 105 may use B.S. 112 as both a downlink TP and as an uplink RP.

In some examples, as shown in FIG. 1B, UE 105 may be located farther away from B.S. 112 yet closer to B.S. 122 and B.S. 172. For these examples, UE 105 may be able to use B.S. 122 and/or B.S. 172 as an uplink RP and use B.S. 112 as a downlink TP. For example, because B.S. 122 may have a stronger transmit signal due to geological features (e.g., hills or trees) or manmade features (e.g., buildings) in cell 110, B.S. 122 and/or B.S. 172 may be able to receive stronger uplink signals from UE 105 via C.L. 126 or C.L. 176, respectively. Alternatively, in another example, B.S. 122 or B.S. 172 may be arranged to serve as macro cell base stations and may have higher transmission powers compared to B.S. 112 which may be arranged to serve as a pico cell base station. For this alternative example, UE 105 may use B.S. 122 and/or B.S. 172 as downlink TPs due to their relatively higher transmission powers.

In some examples, as described in more detail below, B.S. 112 may include logic and/or features arranged to receive an uplink status signal from UE 105 via C.L. 116. UE 105 may also send uplink status signals to B.S. 122 via C.L. 126 and to B.S. 172 via C.L. 175. B.S. 112 may be arranged to monitor the received uplink status signal at B.S. 122 via Comm. Ch. 125 and monitor the received uplink status signal at B.S. 172 via Comm. Ch. 175. B.S. 112 may also include logic and/or features arranged to determine a target received power parameter or $P_O$ for use by UE 105 based on the received uplink status signal at B.S. 112 and based on the monitored uplink status signals received at B.S. 122 and/or B.S. 172. For this example, the $P_O$ may be transmitted from B.S. 112 to UE 105 via C.L. 116 and UE 105 may adjust one or more transmit power levels based on the transmitted $P_O$. According to some examples, by UE 105 adjusting one or more transmit power levels based on a $P_O$ determined in this manner, UE 105 may be operating in an uplink coordinated multi-point (UL CoMP) mode.

According to some examples, UE 105 me be any electronic device having wireless capabilities or equipment. For some examples, UE 105 may be implemented in a fixed device. A fixed device generally refers to an electronic device designed to be in a fixed, stationary, permanent or otherwise non-moving position or location that does not vary over time. For instance, a fixed device may be installed with fixtures, attachments and housings to prohibit movement, including wired power lines, transmission lines, and so forth. By way of contrast, a mobile device is designed to be portable enough to be frequently moved between various locations over time. It may be appreciated that although a fixed device is generally stationary, some fixed devices may be disconnected from their current equipment in a first fixed location, moved to a second fixed location, and connected to equipment at the second fixed location.

According to some examples, the logic and/or features at B.S. 112, 122, 132, 142, 152, 162 or 172 may include system equipment, such as network equipment for a communications system or network compliant with one or more 3GPP LTE specifications (e.g., LTE-ADV). For example, these base stations may be implemented as evolved Node B (eNB) base stations for a Wireless LTE or LTE-ADV network. Although some examples are described with reference to a base station or eNB, embodiments may utilize any network equipment for a wireless network. The examples are not limited in this context.

In some examples, Comm. Ch. 125, 135, 145, 155, 165 or 175 may include one or more communication links via which B.S. 112 may exchange information with B.S. 122, 132 142, 152, 162 or 172, respectively. The communication links may include various types of wired, wireless or optical communication mediums. For these examples, the communication links may be operated in accordance with one or more applicable communication or networking standards in any version. One such communication or networking standard may include 3GPP LTE-ADV and Comm. Ch. 125, 135, 145, 155, 165 or 175 may be separately arranged to serve as X2 communication channels. According to some examples, logic and/or features at B.S. 112, 122, 132 142, 152, 162 or 172 may include an X2 interface that at least allows for B.S. 112 to monitor received uplink status signals at B.S. 122, 132 142, 152, 162 or 172 via the X2 communication channel.

Figure 2:
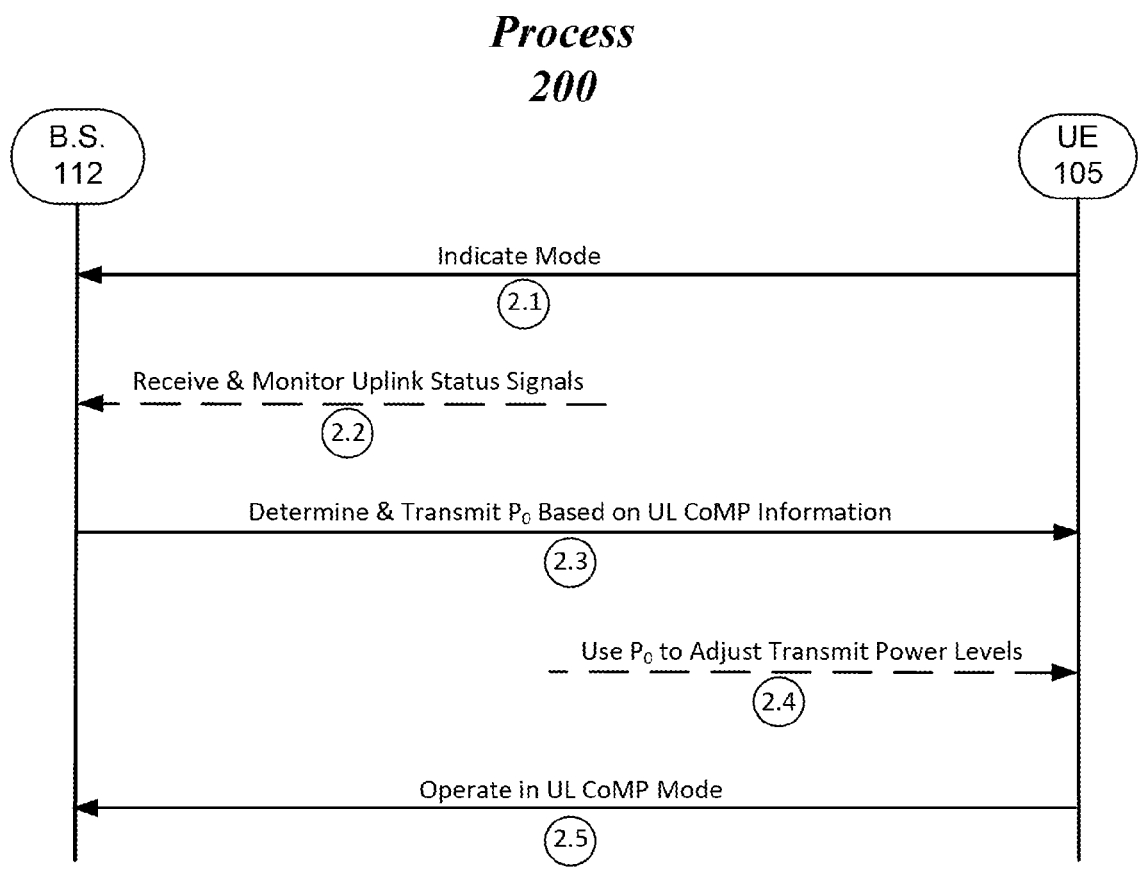
FIG. 2 illustrates an example of a first process.

FIG. 2 illustrates an example of a first process. As shown in FIG. 2, the first process is depicted as process 200. In some examples, process 200 may be for enabling a wireless device such as UE 105 to operate in a UL CoMP mode. For these examples, elements of wireless network 100 as shown in FIGS. 1A-B may be used to illustrate example operations related to process 200. The described example operations are not limited to implementations on wireless network 100 as shown in FIGS. 1A-B.

Beginning at process 2.1 (Indicate Mode), UE 105 may indicate to B.S. 112 whether UE 105 is operating in either a UL CoMP mode or a UL non-CoMP mode. In some examples, UE 105 may be operating in the UL CoMP mode if UE 105 has been providing uplink status signals to one or more RP base stations (e.g., B.S. 122 or 172) that are different than a TP base station (e.g., B.S. 112) for UE 105 and then using a target received parameter or $P_O$ derived or determined based on the provided uplink status signal to adjust transmit power levels. In other examples, UE 105 may be operating in the UL non-CoMP mode if UE 105 is using the same base station for both a RP and TP. Alternatively, UE 105 may be using different base stations for RP and TP but may only be using a $P_0$ that is derived from UL status signals sent to the TP base station. For this alternative example, UE 105 may be operating in the UL non-CoMP mode.

Proceeding to process 2.2 (Receive & Monitor Uplink Status Signals), B.S. 112 may receive uplink status signals from UE 105 and may also monitor uplink status signals received at one or more other base stations. In some examples, as shown in FIG. 1B, UE 105 may be transmitting uplink status signals to B.S. 112 via C.L. 116, to B.S. 122 via C.L. 126 or to B.S. 172 via C.L. 176. For these examples, B.S. 112 may include logic and/or features arranged to monitor uplink status signals received at B.S. 122 through information exchanged via Comm. Ch. 125 or to monitor the uplink status signals received at B.S. 172 through information exchanged via Comm. Ch. 175. This information associated with the received and monitored uplink status signals may be referred to as UL CoMP information.

According to some examples, the logic and/or features at B.S. 122 may determine the power spectral density (PSD) of both the received and monitored uplink status signals in order to compare uplink signal strengths between B.S. 112, 122 or 172. For these examples, UE 105 may be operating in a UL non-CoMP mode and based on the comparison, the logic and/or features at B.S. 122 may determine whether to change UE 105 to operate in a UL CoMP mode. Alternatively, if UE 105 was already operating in a UL CoMP mode, the logic and/or features at B.S. 122 may change the RP base stations used to determine $P_0$ while UE 105 continues to be operated in the UL CoMP mode.

Proceeding to process 2.3 (Determine & Transmit $P_0$ Based on UL CoMP Information), logic and/or features at B.S. 112 may be arranged to determine a $P_0$ based on the UL CoMP information and then transmit the $P_0$ to UE 105. In some examples, signal strengths (e.g., PSDs) determined for the uplink status signals received or monitored by B.S. 112 may be used in various ways to determine the $P_0$ transmitted to UE 105. For example, the strongest PSD associated with one of the received or monitored uplink status signals may be used to determine the $P_0$ transmitted to UE 105. In other examples, separate $P_0$s may be determined based on the uplink status signals received at each of B.S. 112, 122 or 172. The separate $P_0$s may then be averaged to determine the $P_0$ transmitted to UE 105.

In yet another example of determining the $P_0$ transmitted to UE 105, one or more weighting factors may be separately assigned to the uplink status signals received at each of B.S. 112, 122 or 172. PSDs representing the signal strengths for these uplink status signals may then be added or summed to determine a weighted sum value. The $P_0$ transmitted to UE 105 may then be determined based on this weighted sum value. According to some examples, the one or more weighting factors may be associated with, but are not limited to, a mobility of UE 105 (e.g., mobile or stationary), a direction of movement of UE 105, rate of movement of UE 105, or a strength of a given received uplink status signal (e.g., stronger signals may be associated with a higher weighting). By using weighting factors, a $P_0$ may be determined based on various characteristics that may be adaptable to a particular signal environment that UE 105 may be operating within and/or adaptable to wireless system 100 operating conditions.

Proceeding to process 2.4 (Use $P_0$ to Adjust Transmit Power Levels), UE 105 may include logic and/or features arranged to use the $P_0$ received from B.S. 112 to adjust one or more transmit power levels. In some examples, UE 105 may adjust one or more transmit power levels to be able to most effectively use (e.g., conserver power and minimize interference) either B.S. 122 and/or B.S. 172 as an RP.

Proceeding to process 2.5 (Operate in UL CoMP Mode), UE 105 after adjusting the one or more transmit power levels based on the $P_0$ received from B.S. 112, may now operate in the UL CoMP mode. In some examples, B.S. 112 may continue to receive uplink status signals from UE 105 and to monitor uplink status signals received at one or more other base stations of wireless network 100. For these examples, if B.S. 112's monitoring of the uplink status signals indicates that other base stations such as B.S. 152 are now receiving uplink status signals, logic and/or features at B.S. 112 may decide whether to determine an updated $P_0$. In some other examples, UE 105 may move entirely outside of cell 110 and another base station may serve as the TP for UE 105. For these other examples, process 200 may start over but logic and/or features at another base station besides B.S. 112 may determine the updated $P_0$ in a similar manner as described above for process 200 implemented at B.S. 112.

Figure 3:
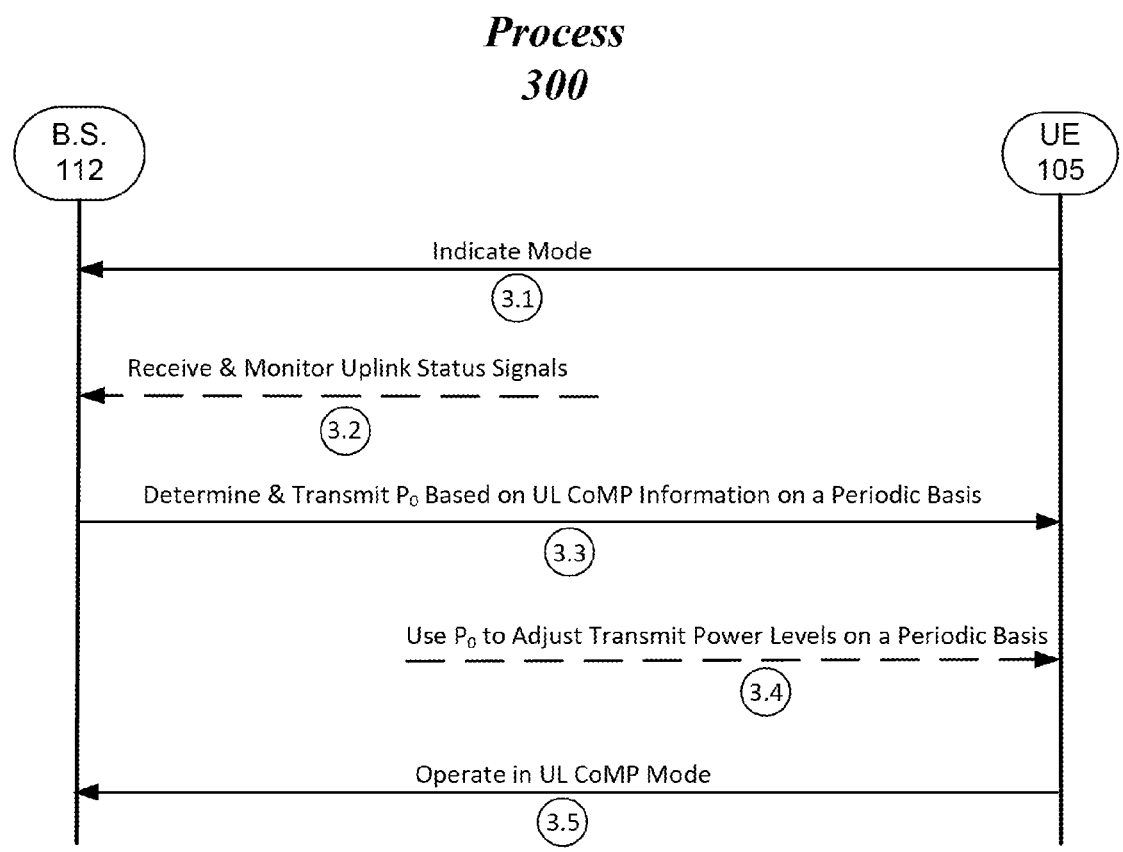
FIG. 3 illustrates an example of a second process.

FIG. 3 illustrates an example of a second process. As shown in FIG. 3, the second process is depicted as process 300. In some examples, process 300 may be for enabling a wireless device such as UE 105 to operate in a UL CoMP mode using closed loop power control commands. For these examples, elements of wireless network 100 as shown in FIGS. 1A-B may be used to illustrate example operations related to process 300. The described example operations are not limited to implementations on wireless network 100 as shown in FIGS. 1A-B.

Beginning at process 3.1 (Indicate Mode), UE 105 may indicate to B.S. 112 whether UE 105 is operating in either a UL CoMP mode or a UL non-CoMP mode. In some examples, similar to what was described for process 200, UE 105 may be operating in a UL CoMP mode or a UL non-CoMP.

Proceeding to process 3.2 (Receive & Monitor Uplink Status Signals), B.S. 112 may receive uplink status signals from UE 105 and may also monitor uplink status signals received at one or more other base stations. In some examples, also similar to what was described for process 200, B.S. 112 may receive the uplink status signals from UE 105 via C.L. 116 and may monitor the uplink status signals received at B.S. 122 or 172 via Comm Ch. 125 or 175, respectively.

Proceeding to process 3.3 (Determine & Transmit $P_0$ Based on UL CoMP Information on a Periodic Basis), logic and/or features at B.S. 112 may be arranged to determine a target received power parameter or $P_0$ based on the UL CoMP information and then transmit the $P_0$ to UE 105 on a periodic basis. Again, similar to process 200, in some examples, signal strengths determined for the uplink status signals received or monitored by B.S. 112 may be used in various ways to determine the $P_0$ transmitted to UE 105. However, unlike process 200, an updated $P_0$ may be transmitted on a periodic basis. As a result of transmitting the updated $P_0$ on a periodic basis, closed loop power control may be maintained between B.S. 112 and UE 105.

Proceeding to process 3.4 (Use $P_0$ to Adjust Transmit Power Levels on a Periodic Basis), UE 105 may include logic and/or features arranged to use the periodically received $P_0$ from B.S. 112 to adjust one or more transmit power levels. In some examples, UE 105 may periodically adjust one or more transmit power levels to be able to most effectively use either B.S. 122 and/or 172 as an RP. Also, UE 105 may periodically adjust the one or more transmit power levels to compensate for a possible $P_O$ value gap that may occur if the UL CoMP information obtained by B.S. 112 has changed between the periodic transmissions of $P_O$.

Proceeding to process 3.5 (Operate in UL CoMP Mode), UE 105, after periodically adjusting the one or more transmit power controls based on the $P_O$ received from B.S. 112, may now operate in the UL CoMP mode.

Figure 4:
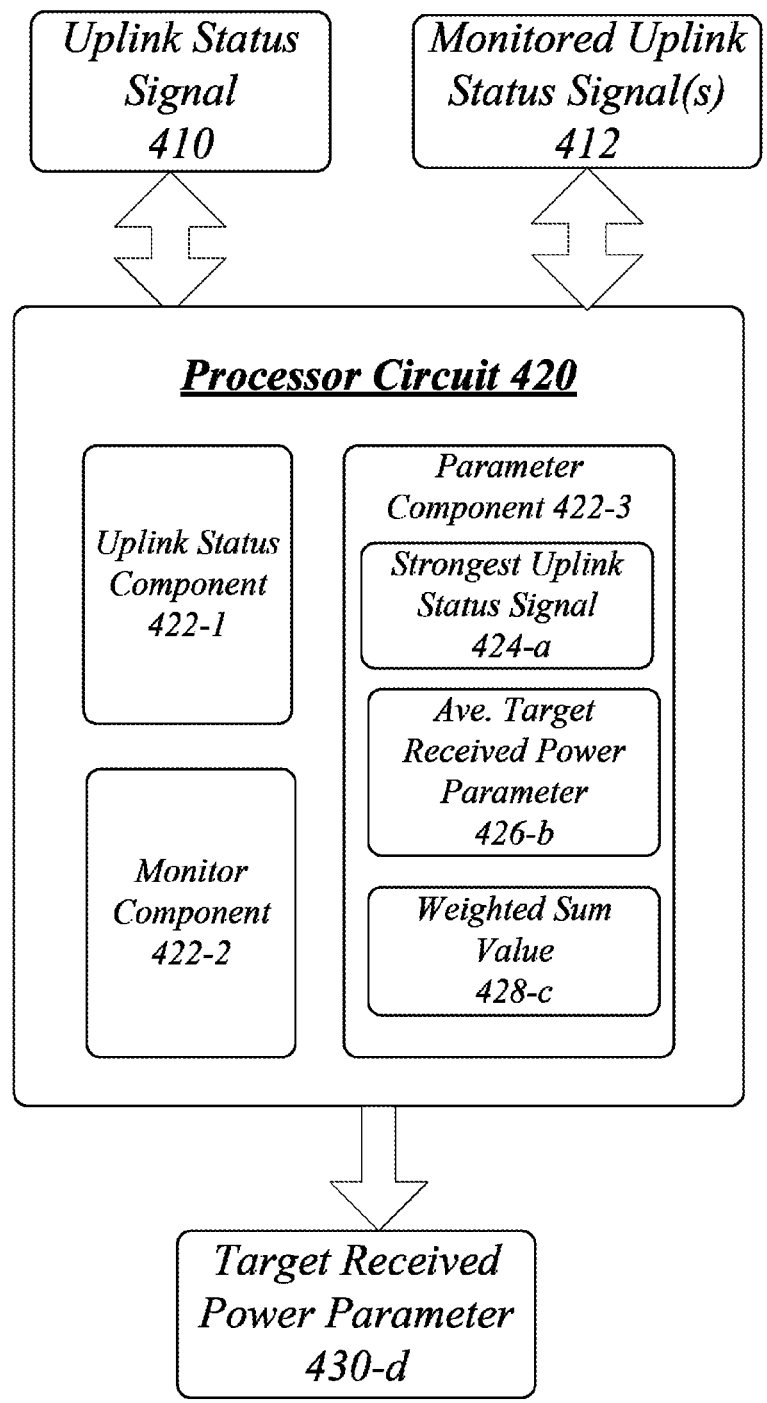
FIG. 4 illustrates an example block diagram for an apparatus.

FIG. 4 illustrates a block diagram for an apparatus 400. Although the apparatus 400 shown in FIG. 4 has a limited number of elements in a certain topology, it may be appreciated that the apparatus 400 may include more or less elements in alternate topologies as desired for a given implementation.

The apparatus 400 may comprise a computer-implemented apparatus 400 having a processor circuit 420 arranged to execute one or more software components 422-a. It is worthy to note that "a" and "b" and "c" and similar designators as used herein are intended to be variables representing any positive integer. Thus, for example, if an implementation sets a value for a=5, then a complete set of software components 422-a may include components 422-1, 422-2, 422-3, 422-4 and 422-5. The embodiments are not limited in this context.

According to some examples, apparatus 400 may be system equipment (e.g., located at or within B.S. 112, 122, 132, 142, 152, 162 or 172), such as network equipment for a communications system or network compliant with one or more 3GPP LTE specifications or standards. For example, apparatus 400 may be implemented as part of a base station or eNB for an LTE and/or LTE-ADV network. Although some examples are described with reference to a base station or eNB, examples may utilize any network equipment for a communications system or network. The examples are not limited in this context.

In some examples, as shown in FIG. 4, apparatus 400 includes processor circuit 420. Processor circuit 420 may be generally arranged to execute one or more software components 422-a. The processing circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, and XScale® processors; and similar processors. Dual microprocessors, multi-core processors, and other multi-processor architectures may also be employed as processing circuit 420.

According to some examples, apparatus 400 may include an uplink status component 422-1. Uplink status component 422-1 may be arranged for execution by processor circuit 420 to receive uplink status signal 410 from a wireless device such as UE 105 in communication with a base station such as B.S. 112 that may be serving as a TP for the wireless device. As mentioned previously, B.S. 112 may receive an uplink status signal UE 105 via a communication link such as C.L. 116 depicted in FIG. 1A or 1B.

In some examples, apparatus 400 may also include a monitor component 422-2. Monitor component 422-2 may be arranged for execution by processor circuit 420 to monitor one or more other uplink status signals received at one or more other base stations from the wireless device. For these examples, monitored uplink status signal(s) 412 may represent the information obtained via the monitoring of the other uplink status signals. According to some examples, wireless network 100 and B.S. 112, 122, 132, 142, 152, 162 or 172 may be arranged to operate in accordance with one or more 3GPP LTE specifications or standards such as those associated with LTE-ADV. For these examples, the monitored uplink status signal(s) 412 may be obtained by exchanging information between base stations via an X2 communication channel. Other communication channels may be used and the examples are not limited in this context.

In some examples, apparatus 400 may also include a parameter component 422-3. Parameter component 422-3 may be arranged for execution by processor circuit 420 to determine a target received power parameter 430-d for the wireless device. Target received power parameter 430-d may be determined based on both the received uplink status signal 410 and the monitored uplink status signal(s) 412.

According to some examples, parameter component 422-3 may be arranged to determine target received power parameter 430-d based, at least in part on strongest uplink status signal 424a. For these examples, PSDs may be determined for the uplink status signal 410 or monitored uplink status signal(s) 412. The strongest PSD associated with one of the received or monitored uplink status signals may be included in strongest uplink status signal 424a and a value associated with this PSD may be used by parameter component 422-3 to determine target received power parameter 430-d. Strongest uplink status signal 424-a may be at least temporarily stored in a data structure such as a lookup table (LUT).

In some examples, parameter component 422-3 may also be arranged to determine separate target received power parameters or $P_O$s for each of the received uplink status signal 410 and monitored uplink status signal(s) 412. Parameter component 422-3 may use these separate $P_O$s to determine an average (ave.) received target power parameter 426-b. For these examples, ave. received target power parameter 426-b may be used to determine target received power parameter 430-d. Ave. received target power parameter 426-b may also be stored in a data structure such as an LUT.

According to some examples, parameter component 422-3 may also be arranged to assign one or more weighting factors to the received uplink status signal 410 and monitored uplink status signal(s) 412. Parameter component 422-3 may also be arranged to add signal strengths for these uplink status signals to determine weighted sum value 428-c. For these examples, weighted sum value 428-c may be used to determine target received power parameter 430-d. Weighted sum value 428-c may also be stored in a data structure such as an LUT.

According to some examples and as described in more detail below, target received power parameter 430-d may be transmitted or communicated to the wireless device or UE that transmitted the uplink status signals. The wireless device or UE may then adjust one or more transmit power levels responsive to receiving the target received power parameter 430-d.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 5:
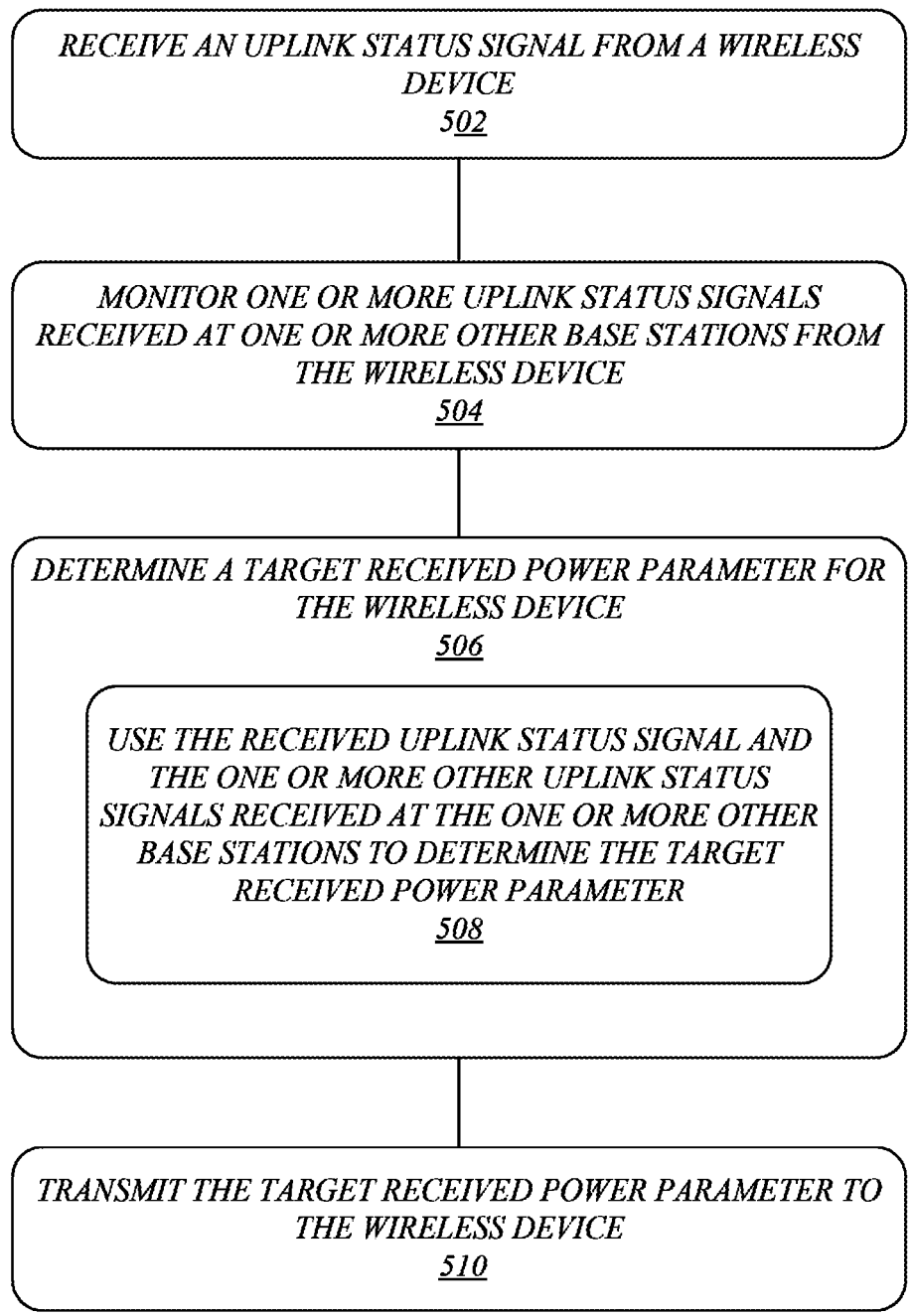
FIG. 5 illustrates an example of a first logic flow.

FIG. 5 illustrates an example of a logic flow 500. Logic flow 500 may be representative of some or all of the operations executed by one or more logic, features, or devices described herein, such as apparatus 400. More particularly, logic flow 500 may be implemented by uplink status component 422-1, monitor component 422-2 or parameter component 422-3.

In the illustrated example shown in FIG. 5, logic flow 500 may receive an uplink status signal from a wireless device at block 502. Apparatus 400 may receive uplink status signal 410 that may have been transmitted by a wireless device that may be using a base station (e.g., B.S. 112 in FIG. 1A/B) including apparatus 400 as a TP and possibly also using the base station as an RP when coupling to a wireless network. For example, B.S. 112 may include apparatus 400 and may be communicatively coupled to UE 105 via C.L. 116 and uplink status component 422-1 may measure the strength of received uplink status signal 410 by determining a PSD.

In some examples, logic flow 500 may monitor one or more uplink status signals received at one or more other base stations from the wireless device that may also be used by the wireless device as RPs. For these examples, apparatus 400 may obtain monitored uplink status signal(s) 412 via a communication channel capable of being coupled to the one or more base stations that received the uplink status signals from the wireless device. For example, B.S. 112 may be communicatively coupled to B.S. 122 and B.S. 172 via Comm. Ch. 125 and 175, respectively. For this example, UE 105 may also couple to B.S. 122 via C.L. 126 and B.S. 172 via C.L. 176 and may transmit uplink status signals to B.S. 122 and B.S. 176 via these communication links. Monitor component 422-2 may obtain monitored uplink status signal(s) 412 from B.S. 112 and B.S. 176 via Comm. Ch. 125 and 175, respectively. The obtained monitored uplink status signal(s) 412 may include an indication of received uplink signal strengths (e.g., PSD) at B.S. 122 and B.S. 176.

According to some examples logic flow 500 at block 506 may determine a target received parameter 430-d based on the received uplink status signal 410 and monitored uplink status signal(s) as mentioned above at blocks 502 and 504.

According to some examples, logic flow 500 may use the received uplink status signal and the one or more uplink status signals received at the one or more other base stations to determine the target received parameter 430-d at block 508. For example, parameter component 422-3 may use strongest uplink status signal 424-a to determine the target received parameter 430-d. Parameter component 422-3 may also use ave. target received power parameter 426-b to determine the target received parameter 430-d. Parameter component 422-3 may also use weighted sum value 428-c to determine the target received parameter 430-d.

In some examples, logic flow 500 may communicate or transmit the target received parameter 430-d to the wireless device. For example, a radio interface coupled to processor circuit 420 may communicate the target received parameter 430-d to UE 105. A communication path or link such as C.L. 116 between B.S. 112 and UE 105 as shown in FIG. 1A or 1B may be used to communicate or transmit the target received parameter 430-d to UE 105.

Various components of apparatus 400 and a device implementing apparatus 400 may be communicatively coupled to each other by various types of communications media to coordinate operations. The coordination may involve the uni-directional or bi-directional exchange of information. For instance, the components may communicate information in the form of signals transmitted over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Figure 6:
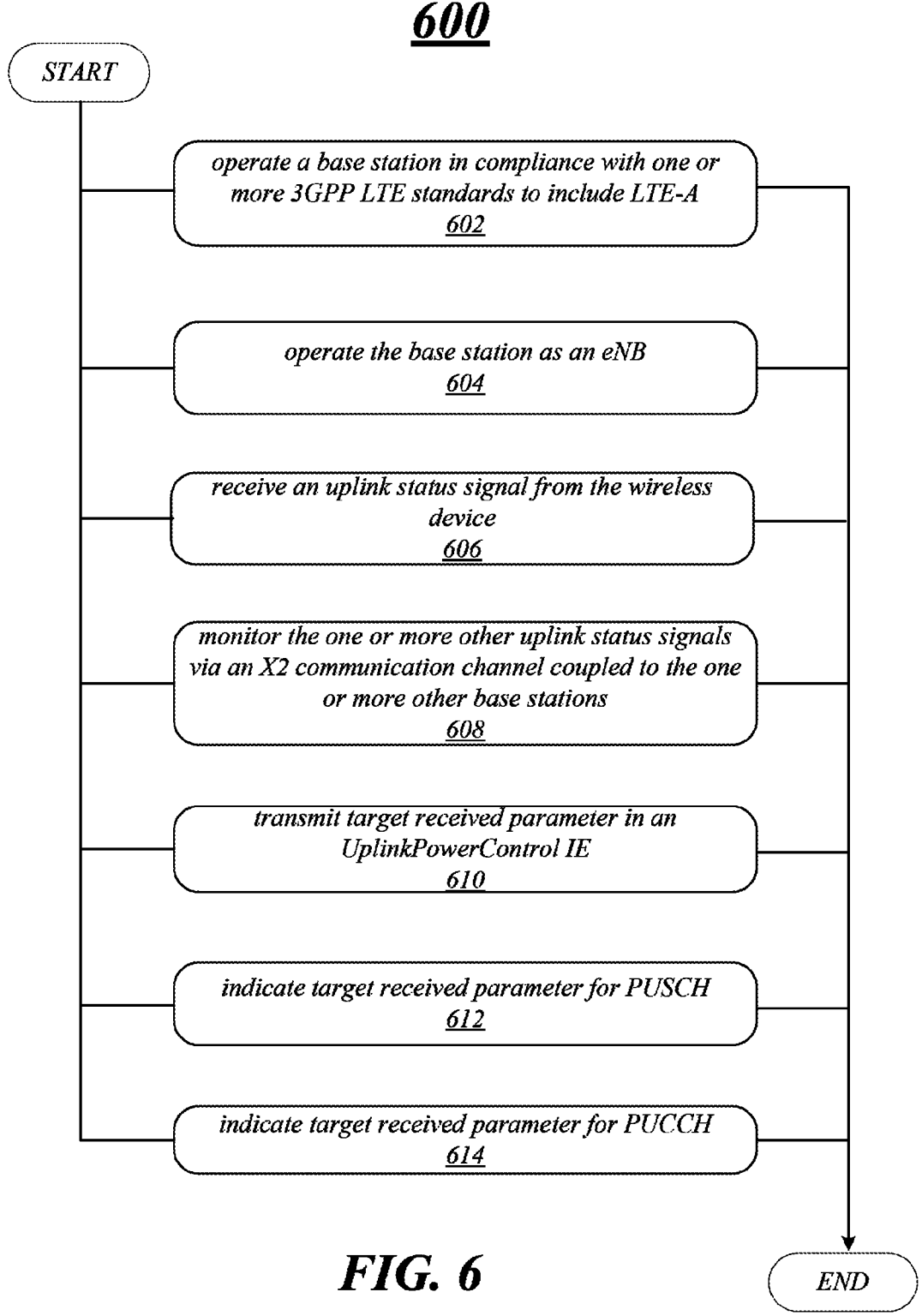
FIG. 6 illustrates an example of a second logic flow.

FIG. 6 illustrates an example of a logic flow 600. Logic flow 600 may be representative of some or all of the operations executed by one or more logic, features, or devices described herein, such as apparatus 400. More particularly, logic flow 600 may be implemented by uplink status component 422-1, monitor component 422-2, or parameter component 422-3.

In the illustrated example shown in FIG. 6, logic flow 600 may operate a base station in compliance with one or more 3GPP LTE standards or specifications to include specifications associated with LTE-ADV at block 602. For example, the base stations depicted in FIGS. 1A-B such as B.S. 112, B.S. 122 or B.S. 172 may be arranged to operate in compliance with one or more standards associated with LTE-ADV.

According to some examples, logic flow 600 may operate B.S. 112 as an eNB at block 604. For example, B.S. 112 may be arranged to operate as an eNB for cell 110 in wireless network 100. Also, B.S. 122 and B.S. 172 may be arranged to operate as an eNBs for cells 120 and cell 170, respectively.

In some examples, logic flow 600 may receive an uplink status signal from a wireless device at block 606. For example, components of apparatus 400 at B.S. 112 such as uplink status component 422-1 may receive uplink status signal 410 from UE 105 via C.L. 116.

According to some examples, logic flow 600 may monitor one or more other uplink status signals received from the wireless device via an X2 communication channel coupled to the one or more other base stations at block 608. For example, components of apparatus 400 at base B.S. 112 such as monitor component 422-2 may obtain monitored uplink status signal(s) 412 from B.S. 122 via Comm. Ch. 125 and/or from B.S. 172 via Comm. Ch. 175. For this example, as mentioned above for logic flow 500, parameter component 422-3 may determine a target received power parameter 430-d based on the received uplink status signal 410 and/or the monitored uplink status signal 412.

In some examples, logic flow 600 may transmit target received power parameter 430-d in an UplinkPowerControl information element (IE) at block 610. For these examples, the target received power parameter 430-d may cause UE 105 to adjust one or more transmit power controls in order to operate in a UL CoMP mode for either an open loop (see process 200) or closed loop (see process 300) environment.

In some examples, logic flow 600 may indicate a target received power parameter 430-d for the physical uplink shared channel (PUSCH) at block 612. UE 105 may also be arranged to operate according to one or more 3GPP LTE standards or specifications to include standards associated with LTE-ADV. For these examples, the target received power parameter 430-d for PUSCH may be transmitted to UE 105 in an UplinkPowerControl IE and identified as $P_{0\_Nominal\_PUSCH\_ULCoMP,c}$.

According to some examples, logic flow 600 may also indicate a target received power parameter 430-d for the physical uplink control channel (PUCCH) at block 614. For these examples, the target received power parameter 430-d for PUCCH may be transmitted to UE 105 in an Uplink-PowerControl IE and identified as $P_{0\_Nominal\_PUCCH\_ULCoMP,c}$. Logic flow 600 may now come to an end.

In some examples, $P_{0\_Nominal\_PUSCH\_ULCoMP,c}$ and $P_{0\_Nominal\_PUCCH\_ULCoMP,c}$ may be indicated to a wireless device such as UE 105 via a power control related message in an example UplinkPowerControl IE that includes target received power parameter information as shown in Table I. This disclosure is not limited to this format.

TABLE I

| UplinkPowerControlULCoMPDedicated – r11 :: =SEQUENCE{ | |
|---|---|
| ... | |
| p0-NorminalPUSCH-ULCoMP | INTEGER(–126..24), |
| p0-NorminalPUCCH-ULCoMP | INTEGER(127..–96), |
| ... | |
| } | |

According to some examples, the UE may adjust transmission power levels responsive to receiving the UplinkPowerControl IE in the example format as shown in Table I. For these examples, the UE may be arranged to operate in compliance with one or more LTE-ADV standards. In order to adjust transmission power levels, the UE may implement algorithms as defined by one or more LTE-ADV standards for both $P_{0\_PUSCH}$ and $P_{0\_PUCCH}$. In addition to those algorithms for $P_{0\_PUSCH}$, the following example equation (1) as indicated below may also be implemented for $P_{0\_PUSCH}$:

$$P_{0\_PUSCH,c}(j) = P_{0\_Nominal\_PUSCH\_ULCoMP,c} + P_{0\_UE\_PUSCH,c}(j), j=0,1 \quad (1)$$

Where:

$P_{0\_Nominal\_PUSCH\_ULCoMP,c}$ is the p0-NominalPUSCH-ULCoMP carried in current CC.

The following example equation (2) may also be implemented for $P_{0\_PUCCH}$:

$$P_{0\_PUCCH,c}(j) = P_{0\_Nominal\_PUCCH\_ULCoMP,c} + P_{0\_UE\_PUSCH,c}(j), j=0,1 \quad (2)$$

Where:

$P_{0\_Nominal\_PUCCH\_ULCoMP,c}$ is the p0-NominalPUCCH-ULCoMP carried in current CC.

According to some examples, a base station arranged to operate in compliance with one or more LTE-ADV standards may determine a target received power parameter or $P_0$ for both $P_{0\_Nominal\_PUSCH\_ULCoMP,c}$ and $P_{0\_Nominal\_PUCCH\_ULCoMP,c}$ based on implementing various alternatives example equations. These various alternative example equations may be implemented based on a number of RPs for a wireless device, uplink status signal strength, average $P_0$ values for multiple RPs or a weighted sum value of $P_0$ for multiple RPs.

In some examples, a wireless device may couple to a single RP. For these examples, the $P_0$ for the wireless device to operate in a UL CoMP mode may be the $P_0$ value of the RP for a UL non-CoMP mode of operation. Example equations (3) and (4) may be implemented based on these examples.

$$P_{0\_Nominal\_PUSCH\_ULCoMP,c} = P_{0\_Nominal\_PUSCH,c} \quad (3)$$

$$P_{0\_Nominal\_PUCCH\_ULCoMP,c} = P_{0\_Nominal\_PUCCH,c} \quad (4)$$

According to some Examples, $P_0$ may be based on the strongest uplink status signal received at an RP from a wireless device. For these examples, $P_0$ for PUSCH and PUCCH may be determined using example equations (5) and (6).

$$P_{0\_Nominal\_PUSCH\_ULCoMP,c} = P_{0\_Nominal\_PUSCH,c}(RPm) \quad (5)$$

$$P_{0\_Nominal\_PUSCH\_ULCoMP,c} = P_{0\_Nominal\_PUSCH,c}(RPm) \quad (6)$$

Where:

RPm is the RP with the highest received uplink signal strength from the wireless device.

In some examples, $P_0$ may be based on an average value of $P_0$ for all RPs in an RP set for a wireless device. For these examples, $P_0$ for PUSCH and PUCCH may be determined using example equations (7) and (8).

$$P_{0\_Nominal\_PUSCH\_ULCoMP,c} = \frac{1}{N}\sum_{i=1}^{N} P_{0\_NOMINAL\_PUSCH,c}(RPi) \quad (7)$$

$$P_{0\_Nominal\_PUCCH\_ULCoMP,c} = \frac{1}{N}\sum_{i=1}^{N} P_{0\_NOMINAL\_PUCCH,c}(RPi) \quad (8)$$

Where:

RPi, i=1~N, is the RP in the RP set of the wireless device.

According to some examples, $P_0$ may be based on a weighted sum value of $P_0$ for all RPs in an RP set. For these examples, $P_0$ for PUSCH and PUCCH may be determined using example equations (9), (10) and (11), although this disclosure is not limited to these equations for determining the weighted sum value of $P_0$ for all RPs in the RP set.

$$P_{0\_Nominal\_PUSCH\_ULCoMP,c} = \sum_{i=1}^{N} W_i \times P_{0\_NOMINAL\_PUSCH,c}(RPi) \quad (9)$$

$$P_{0\_Nominal\_PUCCH\_ULCoMP,c} = \sum_{i=1}^{N} W_i \times P_{0\_NOMINAL\_PUCCH,c}(RPi) \quad (10)$$

$$W_i = \frac{RSRP(RPi)}{RSRP(Sum)} \quad (11)$$

Where:

RSRP(RPi) is the wireless device uplink received power strength at RPi and

RSRP(Sum) is the sum of the wireless device uplink received power strength from all RPs inside of the RP set.

FIG. 7 illustrates an embodiment of a storage medium 700. The storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions to implement one or more of the logic flows 500 and/or 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
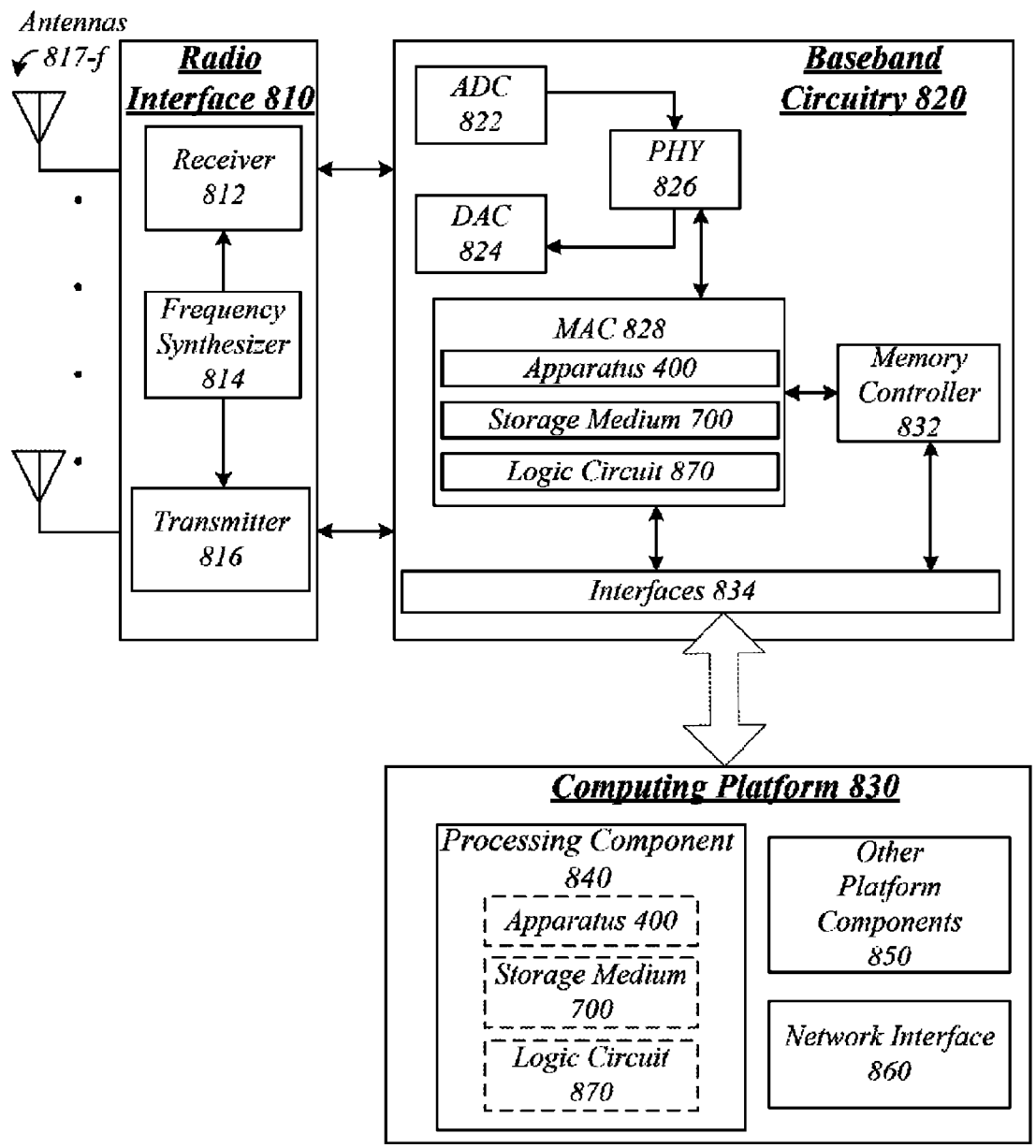
FIG. 8 illustrates an example of a communications architecture.

FIG. 8 illustrates an embodiment of a device 800 for use in a wireless mobile broadband access network. Device 800 may implement, for example, apparatus 400, storage medium 700 and/or a logic circuit 870. The logic circuit 880 may include physical circuits to perform operations described for apparatus 400. As shown in FIG. 8, device 800 may include a radio interface 810, baseband circuitry 820, and computing platform 830, although examples are not limited to this configuration.

The device 800 may implement some or all of the structure and/or operations for the apparatus 400, storage medium 700 and/or logic circuit 880 in a single computing entity, such as entirely within a single device. Alternatively, the device 800 may distribute portions of the structure and/or operations for the apparatus 400, storage medium 700 and/or logic circuit 880 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 810 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 810 may include, for example, a receiver 812, a transmitter 816 and/or a frequency synthesizer 814. Radio interface 810 may include bias controls, a crystal oscillator and/or one or more antennas 818-f. In another embodiment, radio interface 810 may use external voltage-controlled oscillators (VCOs), surface acoustic wave filters, intermediate frequency (IF) filters and/or RF filters as desired. Due to the variety of potential RF interface designs an expansive description thereof is omitted.

Baseband circuitry 820 may communicate with radio interface 810 to process receive and/or transmit signals and may include, for example, an analog-to-digital converter 822 for down converting received signals and a digital-to-analog converter 824 for up converting signals for transmission. Further, baseband circuitry 820 may include a baseband or physical layer (PHY) processing circuit 826 for PHY link layer processing of respective receive/transmit signals. Baseband circuitry 820 may include, for example, a processing circuit 828 for medium access control (MAC)/data link layer processing. Baseband circuitry 820 may include a memory controller 832 for communicating with MAC processing circuit 828 and/or a computing platform 830, for example, via one or more interfaces 834.

In some embodiments, PHY processing circuit 826 may include a frame construction and/or detection module, in combination with additional circuitry such as a buffer memory, to construct and/or deconstruct communication frames (e.g., containing subframes). Alternatively or in addition, MAC processing circuit 828 may share processing for certain of these functions or perform these processes independently of PHY processing circuit 826. In some embodiments, MAC and PHY processing may be integrated into a single circuit.

Computing platform 830 may provide computing functionality for device 800. As shown, computing platform 830 may include a processing component 840. In addition to, or alternatively of, baseband circuitry 820 of device 800, processing component 840 may execute processing operations or logic for apparatus 400, storage medium 700, and logic circuit 880 using the processing component 840. Processing component 840 (and/or PHY 826 and/or MAC 828) may comprise various hardware elements, software elements, or a combination of both. Examples of hardware elements may include devices, logic devices, components, processors, microprocessors, circuits, processor circuits (e.g., processor circuit 420 in FIG. 4), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 830 may further include other platform components 850. Other platform components 850 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

Computing platform 830 may further include a network interface 860. In some examples, network interface 860 may include logic and/or features to support an X2 interface as described in one or more 3GPP LTE or LTE-ADV specifications or standards. For these examples, network interface 860 may enable an apparatus 400 located at a base station to communicatively couple to one or more other base stations via an X2 communication channel.

Device 800 may be, for example, user equipment, a computer, a personal computer (PC), a desktop computer, a laptop computer, a notebook computer, a netbook computer, a server, a server array or server farm, a web server, a network server, an Internet server, a work station, a minicomputer, a main frame computer, a supercomputer, a network appliance, a web appliance, a distributed computing system, multiprocessor systems, processor-based systems, wireless access point, base station, node B, subscriber station, mobile subscriber center, radio network controller, router, hub, gateway, bridge, switch, machine, or combination thereof. Accordingly, functions and/or specific configurations of device 800 described herein, may be included or omitted in various embodiments of device 800, as suitably desired. In some embodiments, device 800 may be configured to be compatible with protocols and frequencies associated one or more of the 3GPP LTE Specifications and/or IEEE 802.16 Standards for WMANs, and/or other broadband wireless networks, cited herein, although the examples are not limited in this respect.

Embodiments of device 800 may be implemented using single input single output (SISO) architectures. However, certain implementations may include multiple antennas (e.g., antennas 818-f) for transmission and/or reception using adaptive antenna techniques for beamforming or spatial division multiple access (SDMA) and/or using multiple input multiple output (MIMO) communication techniques.

The components and features of device 800 may be implemented using any combination of discrete circuitry, application specific integrated circuits (ASICs), logic gates and/or single chip architectures. Further, the features of device 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 9:
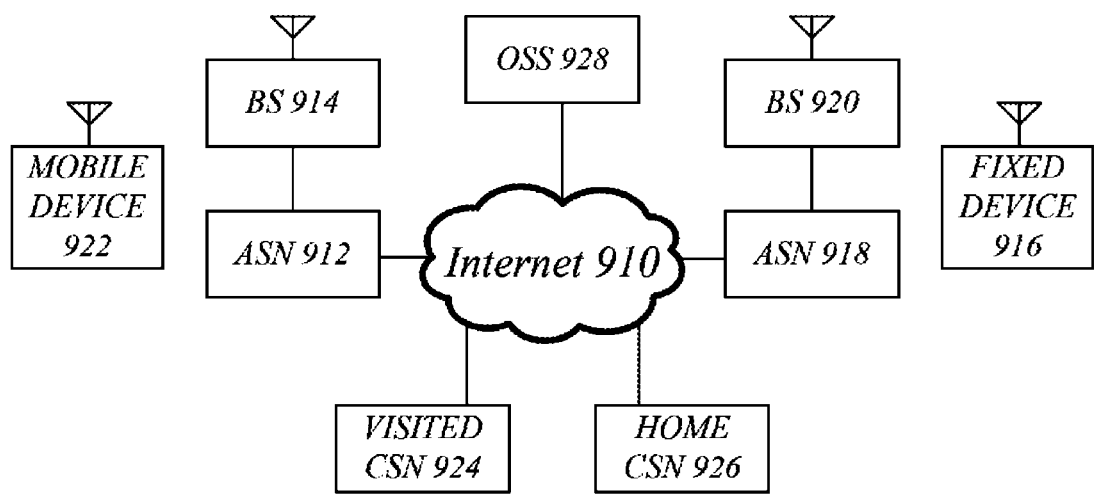
FIG. 9 illustrates an example of a communications system.

FIG. 9 illustrates an embodiment of a broadband wireless access system 900. As shown in FIG. 9, broadband wireless access system 900 may be an internet protocol (IP) type network comprising an Internet 910 type network or the like that is capable of supporting mobile wireless access and/or fixed wireless access to Internet 910. In one or more embodiments, broadband wireless access system 900 may comprise any type of orthogonal frequency division multiple access (OFDMA) based wireless network, such as a system compliant with one or more of the 3GPP LTE Specifications and/or IEEE 802.16 Standards, and the scope of the claimed subject matter is not limited in these respects.

In the exemplary broadband wireless access system 900, access service networks (ASN) 912, 918 are capable of coupling with base stations (BS) 914, 920 (or eNBs), respectively, to provide wireless communication between one or more fixed devices 916 and Internet 910, or one or more mobile devices 922 and Internet 910. One example of a fixed device 916 and a mobile device 922 is UE 105, with the fixed device 916 comprising a stationary version of UE 105 and the mobile device 922 comprising a mobile version of UE 105. ASN 912 may implement profiles that are capable of defining the mapping of network functions to one or more physical entities on broadband wireless access system 900. Base stations 914, 920 (or eNBs) may comprise radio equipment to provide RF communication with fixed device 916 and mobile device 922, such as described with reference to device 900, and may comprise, for example, the PHY and MAC layer equipment in compliance with a 3GPP LTE Specification or an IEEE 802.16 Standard. Base stations 914, 920 (or eNBs) may further comprise an IP backplane to couple to Internet 910 via ASN 912, 918, respectively, although the scope of the claimed subject matter is not limited in these respects.

Broadband wireless access system 900 may further comprise a visited connectivity service network (CSN) 924 capable of providing one or more network functions including but not limited to proxy and/or relay type functions, for example authentication, authorization and accounting (AAA) functions, dynamic host configuration protocol (DHCP) functions, or domain name service controls or the like, domain gateways such as public switched telephone network (PSTN) gateways or voice over internet protocol (VoIP) gateways, and/or IP type server functions, or the like. However, these are merely example of the types of functions that are capable of being provided by visited CSN 924 or home CSN 926, and the scope of the claimed subject matter is not limited in these respects. Visited CSN 924 may be referred to as a visited CSN in the case where visited CSN 924 is not part of the regular service provider of fixed device 916 or mobile device 922, for example where fixed 916 or mobile device 922 is roaming away from their respective home CSN 926, or where broadband wireless access system 900 is part of the regular service provider of fixed device 916 or mobile device 922 but where broadband wireless access system 900 may be in another location or state that is not the main or home location of fixed device 916 or mobile device 922.

Fixed device 916 may be located anywhere within range of one or both base stations 914, 920, such as in or near a home or business to provide home or business customer broadband access to Internet 910 via base stations 914, 920 and ASN 912, 918, respectively, and home CSN 926. It is worthy to note that although fixed device 916 is generally disposed in a stationary location, it may be moved to different locations as needed. Mobile device 922 may be utilized at one or more locations if mobile device 922 is within range of one or both base stations 914, 920, for example.

In accordance with one or more embodiments, operation support system (OSS) 928 may be part of broadband wireless access system 900 to provide management functions for broadband wireless access system 900 and to provide interfaces between functional entities of broadband wireless access system 900. Broadband wireless access system 900 of FIG. 9 is merely one type of wireless network showing a certain number of the components of broadband wireless access system 900, and the scope of the claimed subject matter is not limited in these respects.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled,"

however, may also mean that two or more elements are not in direct contact with each other, but yet still co-operate or interact with each other, e.g., using the wireless medium.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

In some examples, computer-implemented methods may include receiving, at a base station of a wireless network, an uplink status signal from a wireless device. One or more other uplink status signals received at one or more other base stations from the wireless device may also be monitored. A first target received power parameter may be determined for the wireless device based, at least in part, on the received uplink status signal and on the one or more other uplink status signals received at the one or more other base stations. The first target received power parameter may then be transmitted to the wireless device.

According to some examples, the computer-implemented methods may also include the target received power parameter to cause the wireless device to adjust one or more transmit power levels.

In some examples, the computer-implemented methods may also include the base station monitoring the one or more other uplink status signals based, at least in part, on a determination that the wireless device previously adjusted the one or more transmit power levels based on a second target received power parameter previously received from the base station.

According to some examples, the computer-implemented methods may also include the base station to cause the wireless device to operate in an uplink coordinated multi-point (UL CoMP) mode based on a determination that the one or more base stations are capable of serving as reception points for the wireless device.

In some examples, the computer-implemented methods may also include the base station to monitor the one or more uplink status signals received at the one or more base stations via a communication channel capable of communicatively coupling the base station with the one or more other base stations.

According to some examples, the computer-implemented methods may also include determining which uplink status signal from among the uplink status signals received at the base station and the one or more other base stations indicates a strongest uplink status signal. The strongest uplink status signal may then be used to determine the first target received power parameter.

In some examples, the computer-implemented methods may also include determining separate target received power parameters for each of the uplink status signals received at the base station and the one or more other base stations. The separately determined target received power parameters may then be averaged to determine the first target received power parameter.

According to some examples, the computer-implemented methods may also include assigning one or more weighting factors to the uplink status signals received at the base station and the one or more other base stations. Signal strengths for the uplink status signals having the one or more assigned weighting factors may be added to determine a weighted sum value. The first target received power parameter may then be determined based on the weighted sum value. For these examples, the one or more weighting factors to be associated with at least one of mobility of the wireless device, direction of movement of the wireless device, rate of movement of the wireless device or strength of received uplink status signal.

In some examples, the computer-implemented methods may also include transmitting the first target received power parameter to the wireless device in a closed loop power control command. For these examples, the base station may periodically transmit subsequent target received power parameters to cause the wireless device to adjust the one or more transmit power controls based on the subsequent target received power parameters.

According to some examples, the computer-implemented methods may also include operating the base station in compliance with one or more or more 3GPP LTE standards to include LTE-ADV. For these examples, base station may be operated as an eNB and monitoring the one or more other uplink status signals may be via an X2 communication channel capable of communicatively coupling the base station to the one or more other base stations. Also for these examples, the first target received parameter may be transmitted in an UplinkPowerControl Information Element (IE) that may indicate the first target received power parameter for both a Physical Uplink Shared Channel (PUSCH) and a Physical Uplink Control Channel (PUCCH).

According to some examples, at least one machine readable medium comprising a plurality of instructions that in response to being executed on a computing device cause the computing device to carry out the example computer-implemented methods as mentioned above.

In some examples a communications device may be arranged to perform the example computer-implemented methods as mentioned above.

In some examples an apparatus or device may include means for performing the example computer-implemented methods as mentioned above.

According to some examples, an example first apparatus at a base station may include a processor circuit and an uplink status component arranged for execution by the processor circuit to periodically receive uplink status signals from a wireless device. The device may also include monitor component arranged for execution by the processor circuit to monitor one or more other uplink status signals received at one or more other base stations from the wireless device. The device may also include a parameter component arranged for execution by the processor circuit to periodically determine target received power parameters for the wireless device based, at least in part, on the periodically received uplink status signals and on the monitored one or more other uplink status signals received at the one or more other base stations.

In some examples for the example first apparatus, a radio interface may be coupled to the processor circuit to periodically communicate the target received parameters to the wireless device, each periodically communicated target received power parameter to cause the wireless device to periodically adjust one or more transmit power levels. For these examples, the radio interface arranged to periodically communicate the target received parameters in a closed loop power control command to cause the wireless device to periodically adjust the one or more transmit power levels.

According to some examples for the example first apparatus, the monitor component may monitor the one or more uplink status signals received at the one or more base stations via a communication channel capable of communicatively coupling the base station with the one or more other base stations.

In some examples for the example first apparatus, the parameter component may also be arranged to periodically determine which uplink status signal from among an uplink status signal currently received at the base station and the monitored one or more uplink status signals received at the one or more other base stations indicates a strongest uplink status signal and use the strongest uplink status signal to determine the target received power parameter.

According to some examples for the example first apparatus, the parameter component may also be arranged to determine separate target received power parameters for the uplink status signal currently received at the base station and the monitored one or more uplink status signals received at the one or more other base stations and average the separately determined target received power parameters to determine the target received power parameter.

In some examples for the example first apparatus, the parameter component may also be arranged to assign one or more weighting factors to the uplink status signal currently received at the base station and the monitored one or more uplink status signals received at the one or more other base stations, add status signal strengths for the uplink status signals having the one or more assigned weighting factors to determine a weighted sum value, and determine the target received power parameter based on the weighted sum value. For these examples, the one or more weighting factors may be associated with at least one of mobility of the wireless device, direction of movement of the wireless device, rate of movement of the wireless device or strength of received uplink status signal.

According to some examples for the example first apparatus, the base station may be arranged to operate as eNB in compliance with one or more or more 3GPP LTE standards to include LTE-ADV. For these examples, an X2 interface may be coupled to the processor circuit to enable the monitor component to monitor the one or more other uplink status signals via an X2 communication channel capable of being coupled to the one or more other base stations.

In some examples for the example first apparatus, a digital display may be coupled to the processor circuit to present a user interface view.

According to some examples, an example second apparatus at a base station may include means for receiving an uplink status signal from a wireless device. Means for receiving an indication that the wireless device has provided one or more other uplink status signals may also be included in the example second apparatus. Means for obtaining information associated with the one or more other uplink status signals provided to the one or more other base stations may also be included in the example second apparatus. Means for determining a first target received power parameter for the wireless device based, at least in part, on the received uplink status signal and on the information associated with the one or more other uplink status signals received at the one or more other base stations may also be included in the example second apparatus.

In some examples, the example second apparatus may also include means for operating the base station as an eNB in compliance with one or more or 3GPP LTE standards to include LTE-ADV. This example second apparatus may also include means for communicating to the one or more neighboring base stations via an X2 communication channel in order to obtain the information associated with the one or more other uplink status signals provided to the one or more other base stations by the wireless device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    receiving, at a base station of a wireless network, an uplink status signal from a wireless device;
    monitoring, at the base station, via communicative connectivity to one or more other base stations, one or more other uplink status signals received at the one or more other base stations from the wireless device;
    assigning one or more weighting factors to the uplink status signals received at the base station and the one or more other base stations;
    adding signal strengths for the uplink status signals having the one or more assigned weighting factors to determine a weighted sum value;
    determining a first target received power parameter for the wireless device based, at least in part, on the weighted sum value; and
    transmitting the first target received power parameter to the wireless device.

2. The computer-implemented method of claim 1, comprising the target received power parameter to cause the wireless device to adjust one or more transmit power levels.

3. The computer-implemented method of claim 1, the base station monitoring the one or more other uplink status signals based, at least in part, on a determination that the wireless device previously adjusted the one or more transmit power levels based on a second target received power parameter previously received from the base station.

4. The computer-implemented method of claim 1, comprising the base station to cause the wireless device to operate in an uplink coordinated multi-point (UL CoMP) mode based on a determination that the one or more base stations are capable of serving as reception points for the wireless device.

5. The computer-implemented method of claim 1, comprising the base station to monitor the one or more uplink status signals received at the one or more base stations via a communication channel capable of communicatively coupling the base station with the one or more other base stations.

6. The computer-implemented method of claim 1, comprising:
    determining which uplink status signal from among the uplink status signals received at the base station and the one or more other base stations indicates a strongest uplink status signal; and using the strongest uplink status signal to determine the first target received power parameter.

7. The computer-implemented method of claim 1, comprising:
determining separate target received power parameters for each of the uplink status signals received at the base station and the one or more other base stations; and
averaging the separately determined target received power parameters to determine the first target received power parameter.

8. The computer-implemented method of claim 1, comprising the one or more weighting factors to be associated with at least one of a mobility of the wireless device, a direction of movement of the wireless device, a rate of movement of the wireless device or strength of a received uplink status signal.

9. The computer-implemented method of claim 1, transmitting the first target received power parameter to the wireless device in a closed loop power control command.

10. The computer-implemented method of claim 9, comprising the base station periodically transmitting subsequent target received power parameters to cause the wireless device to adjust the one or more transmit power levels based on the subsequent target received power parameters.

11. The computer-implemented method of claim 1, comprising operating the base station in compliance with one or more or more $3^{rd}$ Generation Partnership Project (3GPP) Long Term Evolution (LTE) standards to include LTE-Advanced (LTE-ADV).

12. The computer-implemented method of claim 11, comprising operating the base station as an Evolved Node B (eNB).

13. The computer-implemented method of claim 12, comprising monitoring the one or more other uplink status signals via an X2 communication channel capable of communicatively coupling the base station to the one or more other base stations.

14. The computer-implemented method of claim 11, comprising transmitting the first target received parameter in an UplinkPowerControl Information Element (IE).

15. The computer-implemented method of claim 14, the UplinkPowerControl IE to indicate the first target received power parameter for both the Physical Uplink Shared Channel (PUSCH) and the Physical Uplink Control Channel (PUCCH).

16. An apparatus for a base station comprising:
a processor circuit;
an uplink status component arranged for execution by the processor circuit to periodically receive uplink status signals from a wireless device;
a monitor component arranged for execution by the processor circuit to monitor via communicative connectivity to one or more other base stations, one or more other uplink status signals received at the one or more other base stations from the wireless device; and
a parameter component arranged for execution by the processor circuit to periodically determine target received power parameters for the wireless device based, at least in part, on the periodically received uplink status signals and on the monitored one or more other uplink status signals received at the one or more other base stations, the parameter component arranged to assign one or more weighting factors to the uplink status signal currently received at the base station and the monitored one or more uplink status signals received at the one or more other base stations, add status signal strengths for the uplink status signals having the one or more assigned weighting factors to determine a weighted sum value, and determine the target received power parameter based on the weighted sum value.

17. The apparatus of claim 16, comprising a radio interface coupled to the processor circuit to periodically communicate the target received parameters to the wireless device, each periodically communicated target received power parameter to cause the wireless device to adjust one or more transmit power levels.

18. The apparatus of claim 16, comprising the monitor component to monitor the one or more uplink status signals received at the one or more base stations via a communication channel capable of communicatively coupling the base station with the one or more other base stations.

19. The apparatus of claim 16, comprising the parameter component also arranged to periodically determine which uplink status signal from among an uplink status signal currently received at the base station and the monitored one or more uplink status signals received at the one or more other base stations indicates a strongest uplink status signal and use the strongest uplink status signal to determine the target received power parameter.

20. The apparatus of claim 16, comprising the parameter component also arranged to determine separate target received power parameters for the uplink status signal currently received at the base station and the monitored one or more uplink status signals received at the one or more other base stations and average the separately determined target received power parameters to determine the target received power parameter.

21. The apparatus of claim 16, comprising the one or more weighting factors to be associated with at least one of a mobility of the wireless device, a direction of movement of the wireless device, a rate of movement of the wireless device or strength of a received uplink status signal.

22. The apparatus of claim 16, comprising the base station arranged to operate as an Evolved Node B (eNB) in compliance with one or more or more $3^{rd}$ Generation Partnership Project (3GPP) Long Term Evolution (LTE) standards to include LTE-Advanced (LTE-ADV).

23. The apparatus of claim 22, comprising an X2 interface coupled to the processor circuit to enable the monitor component to monitor the one or more other uplink status signals via an X2 communication channel capable of being coupled to the one or more other base stations.

24. The apparatus of claim 16, comprising a digital display coupled to the processor circuit to present a user interface view.

25. An apparatus for a base station comprising:
means for receiving an uplink status signal from a wireless device;
means for receiving an indication that the wireless device has provided one or more other uplink status signals to one or more other base stations;
means for obtaining via communicative connectivity to the one or more other base stations, information associated with the one or more other uplink status signals provided to the one or more other base stations;
means for assigning one or more weighting factors to the uplink status signals received at the base station and the one or more other base stations;
means for adding signal strengths for the uplink status signals having the one or more assigned weighting factors to determine a weighted sum value;

means for determining a first target received power parameter for the wireless device based, at least in part, on the weighted sum value.

26. The apparatus of claim 25, comprising means for communicating the first target received parameter to the wireless device, the target received power parameter to cause the wireless device to adjust one or more transmit power levels.

27. The apparatus of claim 25, comprising means for operating the base station as an Evolved Node B (eNB) in compliance with one or more or more $3^{rd}$ Generation Partnership Project (3GPP) Long Term Evolution (LTE) standards to include LTE-Advanced (LTE-ADV).

28. The apparatus of claim 27, comprising means for communicating to the one or more other base stations via an X2 communication channel in order to obtain the information associated with the one or more other uplink status signals provided to the one or more other base stations by the wireless device.

* * * * *